(12) United States Patent
Valdes et al.

(10) Patent No.: US 7,724,654 B2
(45) Date of Patent: May 25, 2010

(54) METHOD FOR SYNCHRONIZED TRUNK FAILOVER AND FAILBACK IN A FC-AL SWITCHING ENVIRONMENT

(75) Inventors: Ricardo Luis Valdes, Costa Mesa, CA (US); Thomas Paul Marchi, Costa Mesa, CA (US); Dale Dean Sieg, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1281 days.

(21) Appl. No.: 11/210,025

(22) Filed: Aug. 22, 2005

(65) Prior Publication Data

US 2007/0058529 A1 Mar. 15, 2007

(51) Int. Cl.
*G01R 31/08* (2006.01)
(52) U.S. Cl. .................. 370/222; 370/216; 370/221; 370/225; 370/226; 370/227; 398/1; 398/2; 398/3; 398/4; 398/5; 398/9; 398/17; 398/19; 398/106; 398/107; 398/111
(58) Field of Classification Search ......... 370/216–228, 370/241–253; 398/1–38, 106, 107, 111
See application file for complete search history.

(56) References Cited

U.S. PATENT DOCUMENTS 5,307,353 A * 4/1994 Yamashita et al. ............. 714/4
7,433,300 B1 * 10/2008 Bennett et al. ............... 370/216
7,630,300 B2 * 12/2009 Warren et al. ............... 370/222
2003/0031163 A1 * 2/2003 Cashman et al. ............. 370/351
2003/0063560 A1 * 4/2003 Jenq et al. ................... 370/216
2003/0133712 A1 * 7/2003 Arikawa et al. ................ 398/2
2004/0057453 A1 * 3/2004 Montgomery, Jr. .......... 370/452

* cited by examiner

*Primary Examiner*—William Trost, IV
*Assistant Examiner*—Charles C Jiang
(74) *Attorney, Agent, or Firm*—Morrison & Foerster LLP

(57) ABSTRACT

The synchronization of trunk failover between two FC-AL switches when a primary trunk failure occurs is disclosed. If primary trunk T1 should fail, S1 bypasses the cascade port and sends a MaRK (MRK) ordered set out over duplicate trunk T2 to switch S2. In response, S2 sends an acknowledgement MRK ordered set over T2 back to S1. S1 then reconfigures the switch to establish T2 as the primary trunk, and acts as a masters in the failover process and initiates LIP ordered sets which are communicated to all devices in the system to initialize them. Note that when S2 receives the MRK ordered set and acknowledges it by sending an acknowledgement MRK back to S1, it acts as a slave in the failover process and does not attempt to initiate LIPs, thereby eliminating the possibility of multiple Loop Initialization cycles and reducing the time in which data cannot be transmitted.

31 Claims, 4 Drawing Sheets

US 7,724,654 B2

METHOD FOR SYNCHRONIZED TRUNK FAILOVER AND FAILBACK IN A FC-AL SWITCHING ENVIRONMENT

FIELD OF THE INVENTION

This invention relates to trunking in Fibre Channel Arbitrated Loop (FC-AL) switches, and more particularly, to synchronizing trunk failover and failback to ensure that only one loop initialization occurs, and that loop initialization completes properly and promptly.

BACKGROUND OF THE INVENTION

FIG. 1 illustrates an exemplary Storage Area Network (SAN) 100 comprised of two FC-AL switches S1 and S2, each of which may be a Switch On a Chip (SOC). A number of drives 102 and initiators I1 and I2 are attached to each FC-AL switch S1 and S2 through node ports 104. Each FC-AL switch S1 and S2, when connected to drives and initiators, may form a Switched Bunch Of Disks (SBOD) 120. A processor 108 is also coupled to each switch for executing firmware 122 to perform operations on the switch, among other things.

In addition, cascade ports 106 on the FC-AL switches S1 and S2 enable the switches to be interconnected via two trunks T1 and T2. Trunking involves the use of multiple inter-switch connections for increased throughput and redundancy. In the example of FIG. 1, trunk T1 is designated as the primary trunk, and trunk T2 is designated as the duplicate trunk. Note that the designation of trunks as primary and duplicate does not merely represent a difference in names, but represents substantive differences between the two trunks. In the exemplary configuration of FIG. 1, the initiators I1 and I2 connected to S1 are able to communicate with devices connected to S2 (e.g. drive D1) through the trunks T1 and T2.

However, primary trunk T1 may fail (see 110 in FIG. 1) for a number of reasons. In conventional FC-AL switches, each FC-AL switch (switch S1 and S2 in the example of FIG. 1) responds to the failure independently. When hardware in S1 recognizes the failure, it enters a failover mode and initiates a failover event. Trunk failover and failback is the ability to redirect traffic from a failed trunk to a working trunk and/or back to the original primary trunk once it is re-established. Failover and fail back is managed and driven by an Application Programming Interface (API) 124, which is used to manage each of the switches independently in separate enclosures.

When the failover event is initiated, a bypass event occurs in which the cascade port 106 coupled to the trunk T1 is changed from an "inserted" state (i.e. device connected) to a "bypass" state (i.e. device not connected) according to FC protocols well-understood by those skilled in the art. The hardware in S1 also generates and sends an interrupt to the processor 108 connected to S1, which recognizes that T1 is no longer available but that duplicate trunk T2 exists, and reconfigures the switch to establish T2 as the primary trunk. The processor 108 then initiates a Loop Initialization process to all devices in the SAN 100 to initialize them. When devices receive the Loop Initialization Primitive (LIP) ordered sets at the start of the Loop Initialization cycle, they cease normal communications and enter an initialization state by sending specific ordered sets and frames out over the loop and actively reserving an address, which is necessary to establish subsequent normal communications with other devices on the loop. Normal communications may be resumed only when the Loop Initialization has completed and the participating devices have reserved a new address.

Because each switch is managed by a separate instance of the API, installed in separate enclosures, trunk failures and re-inserts between two enclosures may not be detected simultaneously by the APIs. As a result, failover and fail back may not take place simultaneously; instead, these often occur sequentially, separated by up to approximately 40 ms of time, depending on the rate at which firmware accesses the API. These sequential failover or fail back events cause multiple loop initializations to be triggered which can lead to multiple system issues.

If S1 recognizes the failure before S2, it is possible that the LIP ordered sets generated by S1 may cause all devices attached to S1 to be initialized before switch S2 recognizes the failure and enters a failover mode. However, because S2 has not yet recognized the failure and reconfigured itself to establish T2 as the primary trunk, when S1 tries to send LIP ordered sets down the duplicate trunk T2 (see 112 in FIG. 1), they will be blocked. (Note that duplicate trunks are not allowed to participate in loop initialization, and therefore block LIP primitives and loop initialization frames.) When S2 finally recognizes the failure and enters the failover mode, it reconfigures itself to establish T2 as the primary trunk, and may generate its own LIP ordered sets which causes all devices attached to S2 to be initialized. Furthermore, because S1 had already recognized the failure and had established T2 as the primary trunk, S2 is able to send LIP ordered sets up T2 (see 114 in FIG. 1), which results in the devices connected to S1 to be initialized a second time, a duplication of effort with respect to the devices connected to S1.

In the scenario described above, two independent failover events including multiple LIP ordered sets are generated. During a failover event, no data can be communicated between devices attached to the switches S1 and S2. This time period where no regular communication is possible is approximately the time difference between when the first switch recognized the failure and when the second switch recognized the failure (which is somewhat random and non-deterministic), plus the time it takes for Loop Initialization to complete in both switches, and may represent a potentially severe disruption to data communications.

Note that the possibility of multiple failover events caused by a trunk down event only occurs when the switches are FC-AL switches that act like hubs to connect the devices as though they were in a regular shared arbitrated loop, yet allow multiple switches to be cascaded using trunks. Multiple failover events are a side effect of the capability of the FC-AL switches, and occur because the devices connected to the switches were not designed to handle non-deterministic failover modes.

Therefore, there is a need to be able to synchronize and coordinate trunk failover and failback between the two FC-AL switches when a trunk failure occurs and the primary trunk designation is changed in order to minimize the disruption to data communications caused by multiple unnecessary loop initialization cycles.

SUMMARY OF THE INVENTION

Embodiments of the present invention synchronize and coordinate trunk failover and failback between the two FC-AL switches when a trunk failure occurs and the primary trunk designation is changed in order to minimize the disruption to data communications caused by multiple unnecessary loop initialization cycles. Failover and fail back may be managed and driven by an API, which is used to manage each of the switches independently.

In a system comprised of FC-AL switches S1 and S2 connected together via primary trunk T1 and duplicate trunk T2, if T1 should fail and the T1 failure is detected by S1, S1 initiates a failover event by performing a port bypass event to change the cascade port coupled to T1 to a bypass state and bypass the cascade port. S1 then causes a MaRK (MRK) ordered set to be sent out over T2 to S2. After S1 sends the MRK ordered set, it waits to receive an acknowledgement of the MRK ordered set from S2.

If S2 receives MRK (00, EF), it acknowledges receipt by sending an acknowledgement MRK ordered set over T2 back to S1. If S1 receives the acknowledgement MRK ordered set, S1 reconfigures the switch to establish T2 as the primary trunk as seen from the perspective of both S1 and S2. The processor connected to S1 then acts as a master in the failover process and initiates LIP (F7, F7) ordered sets which are communicated to all devices in the system (all devices connected to S1 and S2) to initialize them. When devices receive the LIP ordered sets, they reserve an address, which is necessary to establish subsequent communications with the devices. Once the devices have been initialized and the Loop Initialization cycle is complete, S1 can return to a normal operation state.

Note that when S2 receives a MRK ordered set and acknowledges it by sending an acknowledgement MRK ordered set back to S1, it acts as a slave in the failover process and does not attempt to initiate LIPs, thereby eliminating the possibility of multiple Loop Initialization cycles and reducing the time in which data cannot be transmitted.

DETAILED DESCRIPTION OF THE PREFERRED EMBODIMENT

In the following description Of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the present invention synchronize and coordinate trunk failover and failback between the two FC-AL switches when a trunk failure occurs and the primary trunk designation is changed in order to minimize the disruption to data communications caused by multiple unnecessary loop initialization cycles.

Figure 1:
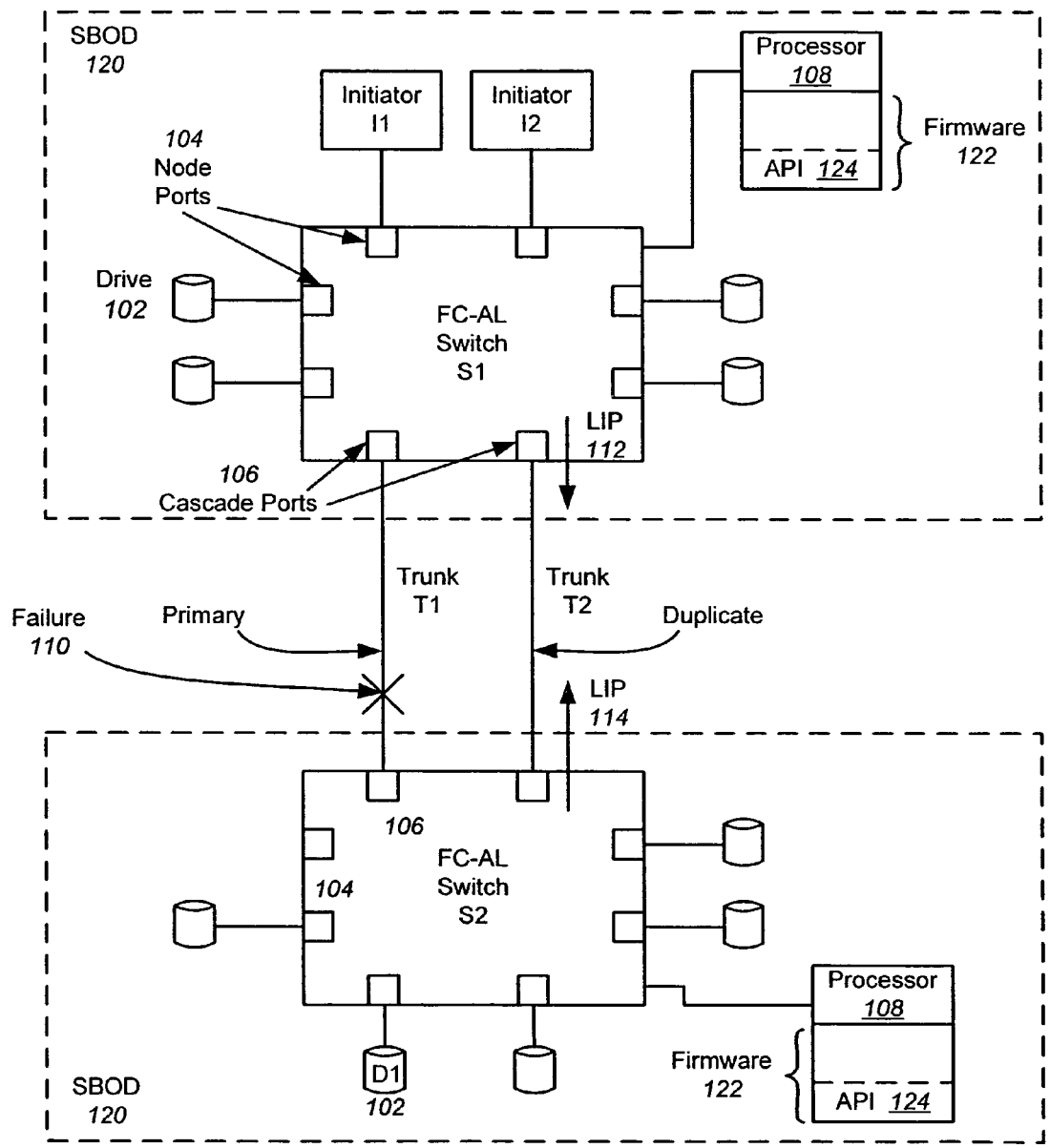
FIG. 1 is an exemplary block diagram of a SAN comprised of two FC-AL switches interconnected using trunking.
Figure 2:
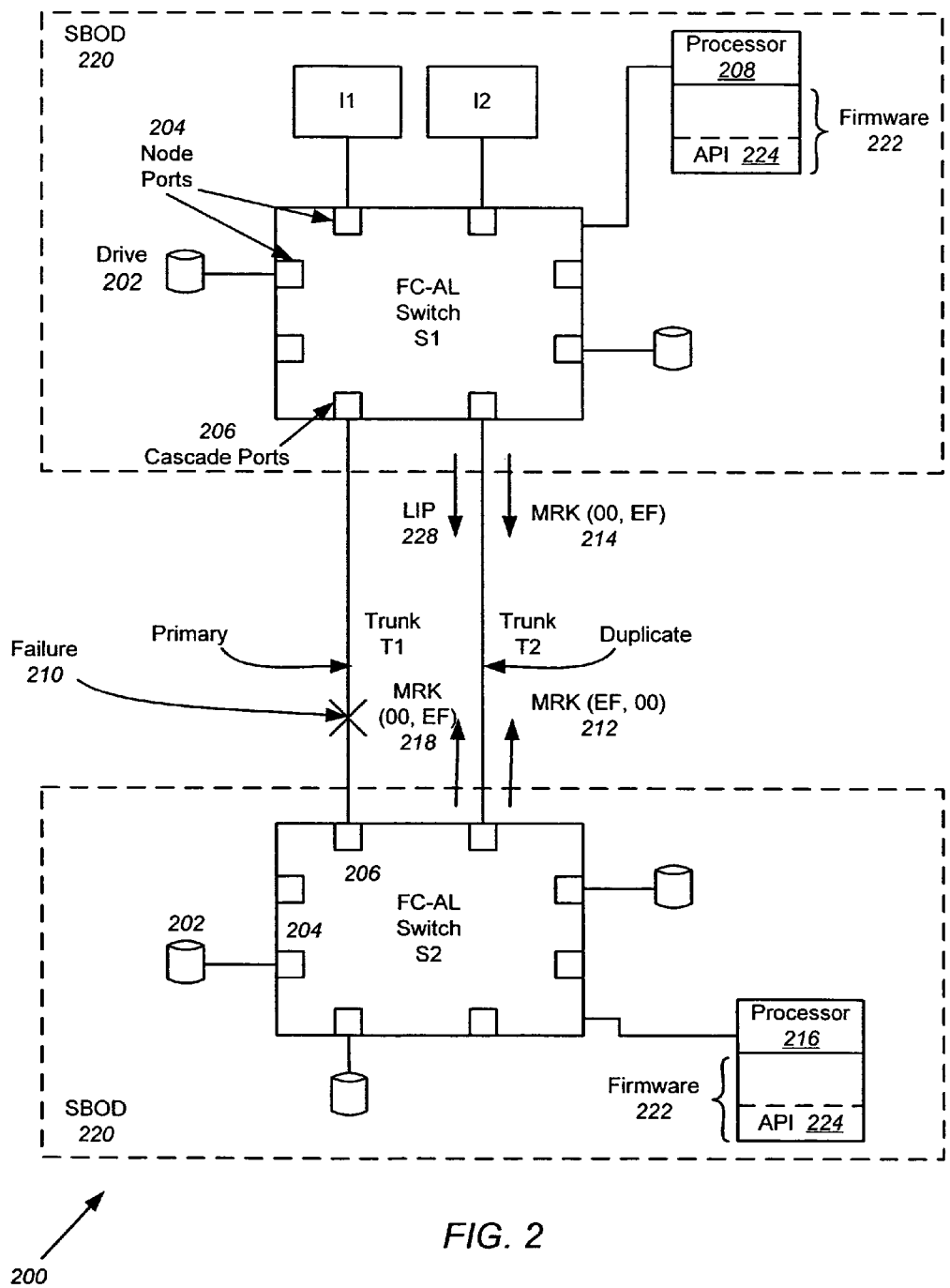
FIG. 2 is an exemplary block diagram of a SAN comprised of two FC-AL switches interconnected using trunking and implementing synchronized trunk failover according to embodiments of the present invention.

FIG. 2 illustrates an exemplary SAN 200 comprised of two FC-AL switches S1 and S2. A number of drives 202 and initiators I1 and I2 are attached to each FC-AL switch S1 and S2 through node ports 204. In addition, cascade ports 206 on the FC-AL switches S1 and S2 enable the switches to be interconnected via two trunks T1 and T2. A processor is also coupled to each switch (see 208 and 216 in FIG. 2) for executing firmware 222 to perform operations on the switch, among other things. In the example of FIG. 2, trunk T1 is designated as the primary trunk, and trunk T2 is designated as the duplicate trunk.

Figure 3:
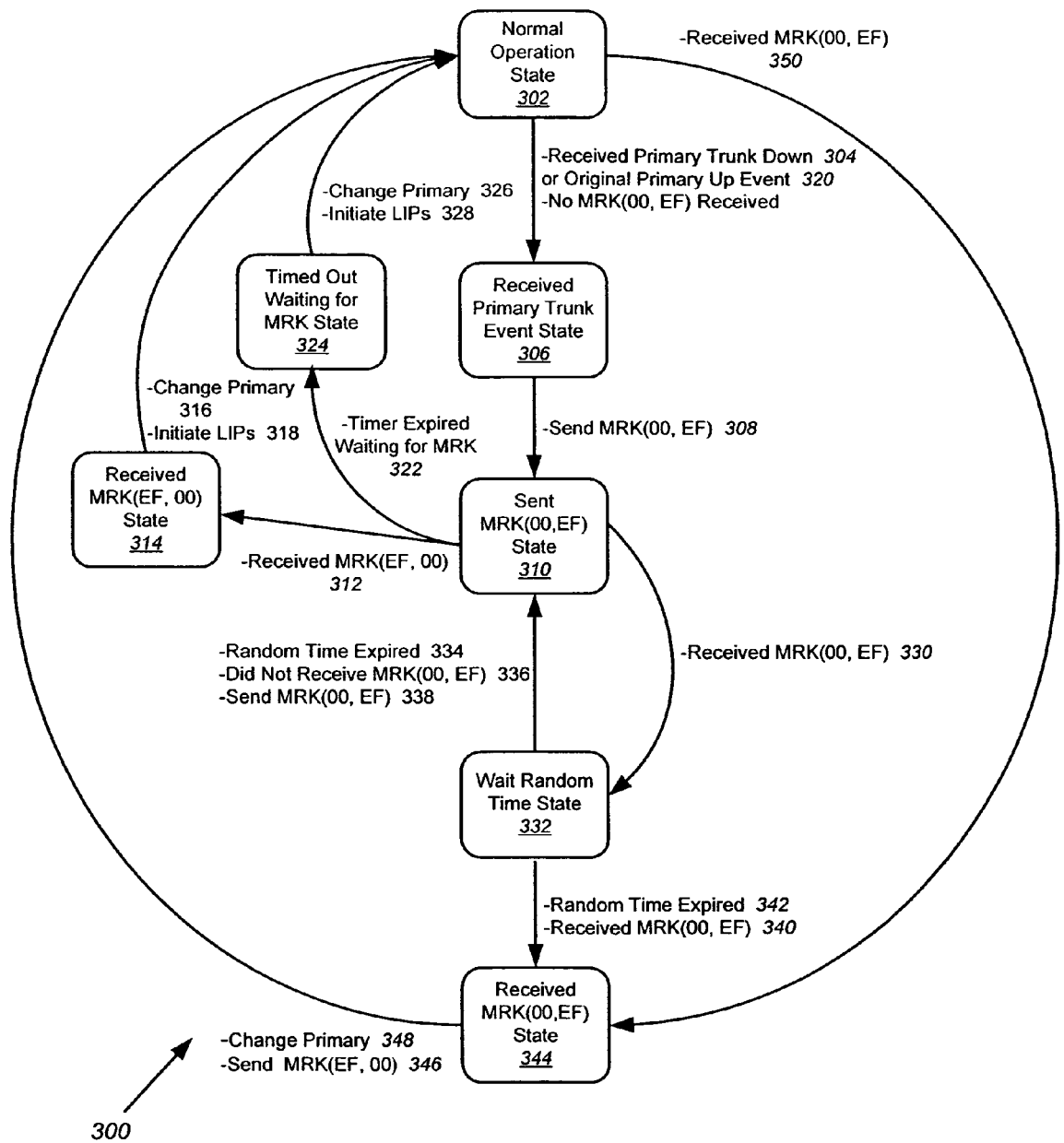
FIG. 3 is an exemplary state diagram of a FC-AL switch implementing synchronized trunk failover and failback according to embodiments of the present invention.

FIG. 3 illustrates a state diagram 300 for the switch S1 of FIG. 2 operating in a normal state, in a synchronized trunk failover state, and in a synchronized trunk failback state according to embodiments of the present invention. Failover and fail back may be managed and driven by an API 224, which is used to manage each of the switches independently in separate enclosures 220. In alternative embodiments, failover and failback could be implemented in hardware implementing a state machine.

Normal operation, both trunks operational. When S1 of FIG. 2 is in a "Normal Operation State" (see 302 in FIG. 3), data is being communicated between devices connected to S1 and to S2, and both trunks T1 (primary) and T2 (duplicate) in FIG. 2 are up and operating normally.

Failover. If primary trunk T1 should fail as indicated at 210 and the T1 failure is detected by S1, hardware in S1 initiates a failover event by performing a port bypass event to change the cascade port 206 coupled to T1 to a bypass state and bypass the cascade port. The cascade port 206 contains hardware such as a state machine that may detect either in-band indications of a T1 failure such as a complete loss of synchronization due to a loss of signal, a particular ordered set such as a LIP F8, or a particular frame, or out-of-band indications of a T1 failure such as dedicated pins that are asserted when a T1 failure occurs. Examples of out-of-band indications include an asserted Receive Loss (RX_LOS) pin or an asserted Transmit Fault (TX_FAULT) pin when a Small Form factor Pluggable (SFP) connection is used on a switch (see the "INS-8074I Specification for SFP (Small Form factor Pluggable) Transceiver" by the SFF Committee). The hardware in S1 generates and sends an interrupt referred to as "Primary Trunk Down Event" to firmware being executed by processor 208. The firmware may call the API 224 every 30 ms or so to determine whether any "Primary Trunk Down Events" have occurred. When the firmware receives the Primary Trunk Down Event interrupt (see 304 in FIG. 3), S1 enters a "Received Primary Trunk Event State" (see 306 in FIG. 3), and the processor connected to S1 causes a MaRK ordered set (e.g. MRK (00, EF)) to be sent out over the duplicate trunk T2 to S2 (see 214 in FIG. 2 and 308 in FIG. 3). The MRK ordered set indicates that S1 received a Primary Trunk Down Event, and indicates to S1 that it should also enter a failover mode. Note that the ordered set MRK (00, EF) will be used herein for purposes of illustration only, a different ordered set could also be used. After S 1 sends MRK (00, EF), it enters a wait state (see 310 in FIG. 3), where it starts a timer and waits to receive an acknowledgement of the MRK (00, EF) ordered set from S2.

Failover, S2 acknowledges. If S2 receives MRK (00, EF), it acknowledges receipt by sending an acknowledgement MRK ordered set (e.g. MRK (EF, 00)) over duplicate trunk T2 back to S1 (see 212 in FIG. 2). If S1 receives the acknowledgement MRK (EF, 00) and the timer has not yet timed out (see 312 in FIG. 3), S1 enters a "Received MRK (EF, 00) State" (see 314 in FIG. 3). The processor 208 connected to S1 recognizes that T1 is no longer available but that duplicate trunk T2 exists, and reconfigures the switch to establish T2 as a temporary primary trunk (see 316 in FIG. 3) as seen from the perspective of both S1 and S2. The processor 208 connected to S1 then acts as a master in the failover process and initiates LIP (F7, F7) ordered sets 228 (see 318 in FIG. 3) which are communicated to all devices in the system (connected to S1 and S2 in the present example) to initialize them. When devices receive the LIP ordered sets, they reserve an address, which is necessary to establish subsequent communications with the devices. Once the devices have been initialized and Loop Initialization is complete, S1 can return to a normal operation state (see 302 in FIG. 3).

Note that when S2 receives MRK (00, EF) and acknowledges it by sending a MRK (EF, 00) back to S1, it acts as a slave in the failover process and does not attempt to initiate LIPs, thereby eliminating the possibility of multiple Loop Initialization cycles and reducing the time in which data cannot be transmitted.

Failover, S2 does not acknowledge. On the other hand, while S1 is still in the wait state (see 310 in FIG. 3), the timer may time out (see 322 in FIG. 3). In such a case, S1 enters a "Timed Out Waiting for MRK State" (see 324 in FIG. 3). This may occur, for example, if S2 does not support synchronized trunk failover. In embodiments of the present invention, the selected approach is to have S1 act as though synchronized trunk failover was not being implemented. Accordingly, the hardware in S1 reconfigures the switch to establish T2 as a temporary primary trunk (see 326 in FIG. 3). The processor 208 connected to S1 then initiates LIP ordered sets (see 328 in FIG. 3) which are communicated to all devices connected to S1 and S2 in an attempt to initialize them. Once the devices have been initialized, S1 can return to a normal operation state (see 302 in FIG.3).

Note that because in the present example S2 does not support synchronized trunk failover, S2 will independently detect the T1 failure and initiate its own failover process, wherein a bypass event occurs in which the cascade port coupled to the trunk T1 is changed from an "inserted" state (i.e. device connected) to a "bypass" state (i.e. device not connected), and S2 is reconfigured to establish T2 as a temporary primary trunk. After S2 is reconfigured to establish T2 as the temporary primary trunk, the LIP ordered sets from S1 may be sent down T2 to initialize the devices connected to S2. Of course, because S2 is acting independently, the processor 216 connected to S2 may also initiate LIP ordered sets that may re-initialize all devices connected to S1 and S2, resulting in a duplication of effort and added disruptions to normal data communications.

Figure 4:
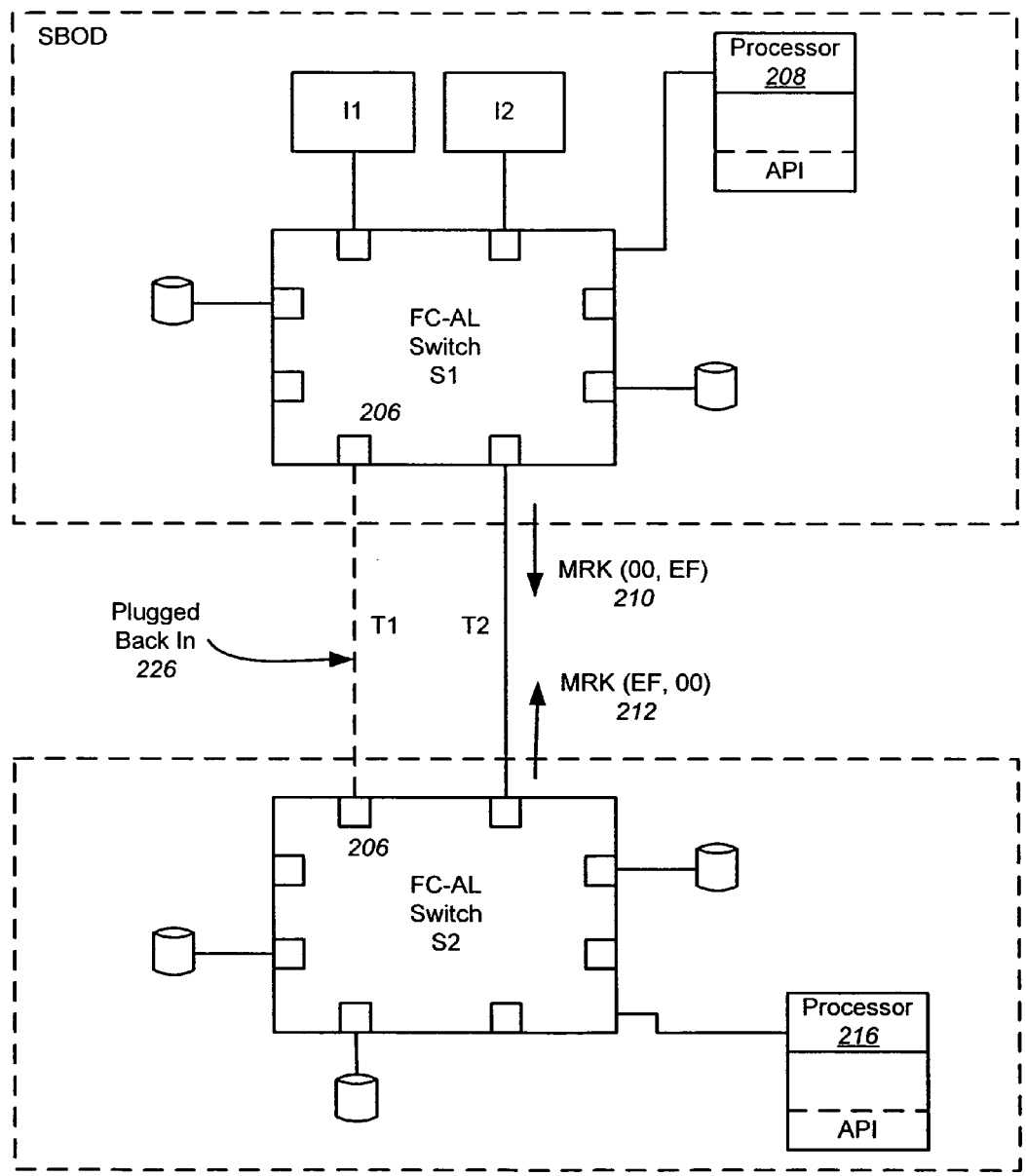
FIG. 4 is an exemplary block diagram of a SAN comprised of two FC-AL switches interconnected using trunking and implementing synchronized trunk failover according to embodiments of the present invention.

Failback. FIG. 4 is a continuation of the exemplary SAN 200 of FIG. 2, wherein T1 has failed, the failover process has run to completion, T2 is now the temporary primary trunk, LIPs have caused the devices connected to be reinitialized, and both S1 and S2 have been operating in a normal operation state 302 for some period of time. Now suppose trunk T1 is properly connected back into cascade ports 206 on both S1 and S2 at 214. When T1 is plugged back in, hardware in S1 will perform a port insert event or a trunk up event to re-insert the cascade port 206, and generate and send an interrupt referred to as an Original Primary Up Event (see 320 in FIG. 3) to the processor 208. When the processor 208 receives the Original Primary Up Event interrupt (see 320 in FIG. 3), S1 once again enters the "Received Primary Trunk Event State" (see 306 in FIG. 3), and the processor connected to S1 causes a MRK ordered set (e.g. MRK (00, EF)) to be sent out over the temporary primary trunk T2 to S2 (see 210 in FIG. 4 and 308 in FIG. 3). After S1 sends MRK (00, EF), it enters a wait state (see 310 in FIG. 3), where it starts a timer and waits to receive an acknowledgement of the MRK (00, EF) ordered set from S2.

Failback, S2 acknowledges. If S2 receives MRK (00, EF), it acknowledges receipt by sending an acknowledgement MRK ordered set (e.g. MRK (EF, 00)) over temporary primary trunk T2 back to S1 (see 212 in FIG. 2). Note that when S2 receives MRK (00, EF), which may be the same MRK ordered set received for either a Primary Trunk Down Event or a Original Primary Up Event, the current designation of the primary trunk will enable S2 to distinguish and recognize which event is occurring at the time.

If S1 receives the acknowledgement MRK (EF, 00) and the timer has not yet timed out (see 312 in FIG. 3), S1 enters the "Received MRK (EF, 00) State" (see 314 in FIG. 3). The hardware in S1 then reconfigures the switch to once again establish T1 as the primary trunk (see 316 in FIG. 3). The processor 208 connected to S1 then acts as the master in the failback process and initiates LIP ordered sets (see 318 in FIG. 3) which are communicated to all devices connected to S1 and S2 to initialize them. When devices receive the LIP ordered sets, they reserve an address, which is necessary to establish subsequent communications with the devices. Once the devices have been initialized, S1 can return to a normal operation state (see 302 in FIG. 3).

Note that when S2 receives MRK (00, EF) and acknowledges it by sending a MRK (EF, 00) back to S1, it acts as the slave in the failback process and does not attempt to initiate LIPs thereby eliminating the possibility of multiple Loop Initialization cycles and reducing the time in which data cannot be transmitted.

Failback, S2 does not acknowledge. On the other hand, if S1 is still in the wait state (see 310 in FIG. 3) and the timer times out (see 322 in FIG. 3), S1 enters a "Timed Out Waiting for MRK State" (see 324 in FIG. 3). The hardware in S1 also reconfigures the switch to establish T2 as a temporary primary trunk (see 326 in FIG. 3). The processor 208 connected to S1 then initiates LIP ordered sets (see 328 in FIG. 3) which are communicated to all devices connected to S1 and S2 in an attempt to initialize them. Once the devices have been initialized, S1 can return to a normal operation state (see 302 in FIG. 3). However, because S2 never acknowledged receipt of the MRK ordered set, it is possible that the LIP ordered set generated by S1 may cause all devices attached only to S1 to be initialized before switch S2 recognizes the failure and enters a failover mode. When S2 finally recognizes the failure and enters the failover mode, it may generate its own LIP ordered set which again causes all devices attached to both S1 and S2 to be initialized. In other scenarios, S1 may become blocked and unable to complete the LIP until S2 recognizes the failure and also enters a failover mode. The LIP ordered set generated by S2 is then able to complete its initialization of all devices attached to S1 and S2.

Failover, simultaneous MRKs. The situation in which both switches S1 and S2 simultaneously recognize a failure and enter a failover mode will now be discussed. As noted above, if primary trunk T1 should fail, hardware in S1 will perform a port bypass event to change the cascade port coupled to T1 to a bypass state and bypass the cascade port, generate and send an interrupt referred to as Primary Trunk Down to the processor 208. When the processor 208 receives the Primary Trunk Down interrupt (see 304 in FIG. 3), which is generally referred to as a Primary Trunk Event, S1 enters a "Received Primary Trunk Event State" (see 306 in FIG. 3), and the processor connected to S1 causes a MRK ordered set (e.g. MRK (00, EF)) to be sent out over the duplicate trunk T2 to S2 (see 210 in FIG. 2 and 308 in FIG. 3). After S1 sends MRK (00, EF), it enters a "Sent MRK (00, EF) State" (see 310 in FIG. 3), where it starts a timer and waits to receive an acknowledgement of the MRK (00, EF) ordered set from S2.

If S2 recognizes the failure at about the same time as S1, then hardware in S2 will also perform a port bypass event to change the cascade port coupled to T1 to a bypass state and bypass the cascade port, generate and send an interrupt referred to as Primary Trunk Down to the processor 216 connected to S2. When the processor 216 receives the Primary Trunk Down interrupt, S2 enters a "Received Primary Trunk Event State," and the processor connected to S2 causes a MRK ordered set (e.g. MRK (00, EF)) to be sent out over the duplicate trunk T2 to S1 at 218. After S2 sends MRK (00, EF), it enters a "Sent MRK (00, EF) State," where it starts a timer and waits to receive an acknowledgement of the MRK (00, EF) ordered set from S1.

At this point in time, both S1 and S2 are in the "Sent MRK (00, EF) State" (see 310 in FIG. 3), each waiting for an acknowledgement MRK (EF, 00) ordered set to be received from the other switch. In other words, because both S1 and S2 detected the T1 failure at about the same time, and both initiated the failover process at about the same time, a collision has occurred. The scenario is handled by a random back off time and resend algorithm described below. This mechanism is used to quickly resolve which of the two connected switches will be responsible for commencing the subsequent loop initialization.

If S1 receives an MRK (00, EF) from S2 instead of the expected acknowledgement MRK (EF, 00) (see 330 in FIG. 3), which indicates that both S1 and S2 have recognized the T1 failure and have initiated a failover process, both S1 and S2 enter a "Wait Random Time State" (see 332 in FIG. 3), where each switch waits a random period of time that is different for each switch. When the random time period for S1 expires (see 334 in FIG. 3), if S1 has not received another MRK (00, EF) from S2 (see 336 in FIG. 3), this indicates that the random time period for Si was shorter than the random time period for S2, and that S1 can act as the master in the failover process and be first in re-sending the MRK (00, EF). Accordingly, S1 re-sends a MRK (00, EF) to S2 across T2 (see 338 in FIG. 2), and re-enters the "Sent MRK (00, EF) State" (see 310 in FIG. 3). Because S2 waits a random time before re-sending the MRK (00, EF), a collision with a MRK (00, EF) re-sent from S2 should be avoided.

When the random time period for S2 expires (see 342 in FIG. 3), S1 will already have sent out a MRK (00, EF) to S2, so S2 will have received a MRK (00, EF). S2 then enters a "Received MRK (00, EF) State" in which S2 acts as a slave in the failover process, and sends an acknowledgement MRK (EF, 00) back to S1 over T2. The hardware in S2 reconfigures the switch to once again establish T1 as the primary trunk, and S2 returns to the "Normal Operation State."

When S1, which was waiting in the "Sent MRK (00, EF) State" 310, receives the acknowledgement MRK (EF, 00) back from S2 (see 312 in FIG. 3), it acts as the master in completing the failover process, as described above.

If, on the other hand, S1 is in the "Wait Random Time State" 332 and the random time period for S1 expires (see 342 in FIG. 3) and S1 has received a MRK (00, EF), this indicates that the random time period for S1 was longer than the random time period for S2, and that S1 should act as the slave in the failover process. S1 then enters a "Received MRK (00, EF) State" (see 344 in FIG. 3) and sends an acknowledgement MRK (EF, 00) back to S2 over T2 (see 346 in FIG. 3). The hardware in S1 reconfigures the switch to once again establish T1 as the primary trunk (see 348 in FIG. 3), and S1 returns to the "Normal Operation State" (see 302 in FIG. 3).

The previous discussion of FIG. 3 presumed that S1 either detected the T1 failure first, or at least detected the T1 failure simultaneously with S2, so that in either case S1 generated a MRK (00, EF). However, in the case where S1 does not detect the T1 failure first, or does not detect the T1 failure simultaneously with T2, S1 may be in the "Normal Operation State" (see 302 in FIG. 3) when it receives a MRK (00, EF) from S2 (see 350 in FIG. 3). In this case, S1 enters the "Received MRK (00, EF) State" (see 344 in FIG. 3), in which S1 acts as a slave in the failover process, and sends an acknowledgement MRK (EF, 00) back to S2 over T2 (see 346 in FIG. 3). The hardware in S1 reconfigures the switch to establish T2 as the primary trunk (see 348 in FIG. 3), and S1 returns to the "Normal Operation State" (see 302 in FIG. 3).

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a first Fibre Channel Arbitrated Loop (FC-AL) switch connectable to a second FC-AL switch via a primary and a duplicate trunk, a method for synchronizing trunk failover, comprising:
   detecting a primary trunk failure and entering a failover mode; and
   while in the failover mode,
      if no MaRK (MRK) ordered set has been received from the second FC-AL switch over the duplicate trunk, sending a MRK ordered set to the second FC-AL switch over the duplicate trunk, and
      if an acknowledgement MRK ordered set is thereafter received from the second FC-AL switch over the duplicate trunk,
         reconfiguring the duplicate trunk to be a temporary primary trunk, and
         initiating, by the first FC-AL switch, a Loop Initialization cycle to initialize devices connected to the first and second FC-AL switches while precluding the second FC-AL switch from attempting to initiate a separate Loop Initialization cycle.

2. The method as recited in claim 1, further comprising while in the failover mode:
   if the acknowledgement MRK ordered set is not received from the second FC-AL switch over the duplicate trunk, reconfiguring the duplicate trunk to be a temporary primary trunk, and
   initiating a Loop Initialization cycle by sending a LIP primitive in an attempt to initialize devices connected to the first and second FC-AL switches.

3. The method as recited in claim 1, further comprising while in the failover mode:
   if, after sending the MRK ordered set to the second FC-AL switch over the duplicate trunk, a MRK ordered set is received from the second FC-AL switch over the duplicate trunk instead of an acknowledgement MRK ordered set,
      waiting a random time period, and
      if a MRK ordered set is not received from the second FC-AL switch over the duplicate trunk by the end of the random time period, re-sending the MRK ordered set to the second FC-AL switch over the duplicate trunk; and if an acknowledgement MRK ordered set is thereafter received from the second FC-AL switch over the duplicate trunk, reconfiguring the duplicate trunk to be a temporary primary trunk, and
initiating a Loop Initialization cycle to initialize devices connected to the first and second FC-AL switches.

4. The method as recited in claim 3, further comprising while in the failover mode:
if a MRK ordered set is received from the second FC-AL switch over the duplicate trunk by the end of the random time period,
reconfiguring the duplicate trunk to be a temporary primary trunk, and
sending an acknowledgement MRK ordered set to the second FC-AL switch over the duplicate trunk.

5. The method as recited in claim 1, further comprising synchronizing trunk failback by:
detecting a primary trunk up event and entering a failback mode; and
while in the failback mode,
if no MRK ordered set has been received from the second FC-AL switch over the temporary primary trunk, sending a MRK ordered set to the second FC-AL switch over the temporary primary trunk, and
if an acknowledgement MRK ordered set is thereafter received from the second FC-AL switch over the temporary primary trunk,
reconfiguring the previously failed primary trunk to once again be the primary trunk, and reconfiguring the temporary primary trunk to once again be the duplicate trunk, and
initiating a Loop Initialization cycle to initialize devices connected to the first and second FC-AL switches.

6. The method as recited in claim 5, further comprising while in the failback mode:
if the acknowledgement MRK ordered set is not received from the second FC-AL switch over the temporary primary trunk,
reconfiguring the previously failed primary trunk to once again be the primary trunk, and reconfiguring the temporary primary trunk to once again be the duplicate trunk, and
initiating a Loop Initialization cycle in an attempt to initialize devices connected to the first and second FC-AL switches.

7. The method as recited in claim 5, further comprising while in the failback mode:
if, after sending the MRK ordered set to the second FC-AL switch over the temporary primary trunk, a MRK ordered set is received from the second FC-AL switch over the temporary primary trunk instead of an acknowledgement MRK ordered set,
waiting a random time period, and
if a MRK ordered set is not received from the second FC-AL switch over the temporary primary trunk by the end of the random time period, re-sending the MRK ordered set to the second FC-AL switch over the temporary primary trunk; and if an acknowledgement MRK ordered set is thereafter received from the second FC-AL switch over the temporary primary trunk,
reconfiguring the previously failed primary trunk to once again be the primary trunk, and reconfiguring the temporary primary trunk to once again be the duplicate trunk, and
initiating a Loop Initialization cycle to initialize devices connected to the first and second FC-AL switches.

8. The method as recited in claim 7, further comprising while in the failback mode:
if a MRK ordered set is received from the second FC-AL switch over the temporary primary trunk by the end of the random time period,
reconfiguring the previously failed primary trunk to once again be the primary trunk, and reconfiguring the temporary primary trunk to once again be the duplicate trunk, and
sending an acknowledgement MRK ordered set to the second FC-AL switch over the temporary primary trunk.

9. In a second Fibre Channel Arbitrated Loop (FC-AL) switch connectable to a first FC-AL switch via a primary and a duplicate trunk, a method for assisting in synchronizing trunk failover, comprising:
if a MaRK (MRK) ordered set is received from the first FC-AL switch over the duplicate trunk,
reconfiguring the duplicate trunk to be a temporary primary trunk without initiating, by the second FC-AL switch, a Loop Initialization cycle to initialize devices connected to the first and second FC-AL switches, and
sending an acknowledgement MRK ordered set to the first FC-AL switch over the duplicate trunk to initiate, by the first FC-AL switch, a Loop Initialization cycle to initialize devices connected to the first and second FC-AL switches.

10. In a second Fibre Channel Arbitrated Loop (FC-AL) switch connectable to a first FC-AL switch via a primary and a duplicate trunk, wherein the primary trunk has failed and the duplicate trunk has been reconfigured as a temporary primary trunk, a method for assisting in synchronizing trunk failback, comprising:
if a MaRK (MRK) ordered set is received from the first FC-AL switch over the temporary primary trunk,
reconfiguring the previously failed primary trunk to once again be the primary trunk, and reconfiguring the temporary primary trunk to once again be the duplicate trunk, without initiating, by the second FC-AL switch, a Loop Initialization cycle to initialize devices connected to the first and second FC-AL switches, and
sending an acknowledgement MRK ordered set to the first FC-AL switch over the temporary primary trunk to initiate, by the first FC-AL switch, a Loop Initialization cycle to initialize devices connected to the first and second FC-AL switches.

11. A first Fibre Channel Arbitrated Loop (FC-AL) switch connectable to a second FC-AL switch via a primary and a duplicate trunk for synchronizing trunk failover, comprising:
hardware for detecting a primary trunk failure; and
one or more processors programmed for performing the steps of
receiving a notification from the hardware of the primary trunk failure and entering a failover mode, and
while in the failover mode,
if no MaRK (MRK) ordered set has been received from the second FC-AL switch over the duplicate trunk, sending a MRK ordered set to the second FC-AL switch over the duplicate trunk, and
if an acknowledgement MRK ordered set is thereafter received from the second FC-AL switch over the duplicate trunk, reconfiguring the duplicate trunk to be a temporary primary trunk, and initiating, by the first FC-AL switch, a Loop Initialization cycle to initialize devices connected to the first and second FC-AL switches while precluding the second FC-AL switch from attempting to initiate a separate Loop Initialization cycle.

12. The first FC-AL switch as recited in claim 11, the one or more processors further programmed for performing, while in the failover mode, the steps of:

if the acknowledgement MRK ordered set is not received from the second FC-AL switch over the duplicate trunk, reconfiguring the duplicate trunk to be a temporary primary trunk, and initiating a Loop Initialization cycle in an attempt to initialize devices connected to the first and second FC-AL switches.

13. The first FC-AL switch as recited in claim 11, the one or more processors further programmed for performing, while in the failover mode, the steps of:

if, after sending the MRK ordered set to the second FC-AL switch over the duplicate trunk, a MRK ordered set is received from the second FC-AL switch over the duplicate trunk instead of an acknowledgement MRK ordered set, waiting a random time period, and if a MRK ordered set is not received from the second FC-AL switch over the duplicate trunk by the end of the random time period, re-sending the MRK ordered set to the second FC-AL switch over the duplicate trunk; and if an acknowledgement MRK ordered set is thereafter received from the second FC-AL switch over the duplicate trunk, reconfiguring the duplicate trunk to be a temporary primary trunk, and initiating a Loop Initialization cycle to initialize devices connected to the first and second FC-AL switches.

14. The first FC-AL switch as recited in claim 13, the one or more processors further programmed for performing, while in the failover mode, the steps of:

if a MRK ordered set is received from the second FC-AL switch over the duplicate trunk by the end of the random time period, reconfiguring the duplicate trunk to be a temporary primary trunk, and sending an acknowledgement MRK ordered set to the second FC-AL switch over the duplicate trunk.

15. The first FC-AL switch as recited in claim 11, the first FC-AL switch further for synchronizing trunk failback and comprising:

hardware for detecting a primary trunk up event; and one or more processors further programmed for performing the steps of receiving a notification from the hardware of the primary trunk up event and entering a failback mode, and while in the failback mode, if no MRK ordered set has been received from the second FC-AL switch over the temporary primary trunk, sending a MRK ordered set to the second FC-AL switch over the temporary primary trunk, and if an acknowledgement MRK ordered set is thereafter received from the second FC-AL switch over the temporary primary trunk, reconfiguring the previously failed primary trunk to once again be the primary trunk, and reconfiguring the temporary primary trunk to once again be the duplicate trunk, and initiating a Loop Initialization cycle to initialize devices connected to the first and second FC-AL switches.

16. The first FC-AL switch as recited in claim 15, the one or more processors further programmed for performing, while in the failback mode, the steps of:

if the acknowledgement MRK ordered set is not received from the second FC-AL switch over the temporary primary trunk, reconfiguring the previously failed primary trunk to once again be the primary trunk, and reconfiguring the temporary primary trunk to once again be the duplicate trunk, and initiating a Loop Initialization cycle in an attempt to initialize devices connected to the first and second FC-AL switches.

17. The first FC-AL switch as recited in claim 15, the one or more processors further programmed for performing, while in the failback mode, the steps of:

if, after sending the MRK ordered set to the second FC-AL switch over the temporary primary trunk, a MRK ordered set is received from the second FC-AL switch over the temporary primary trunk instead of an acknowledgement MRK ordered set, waiting a random time period, and if a MRK ordered set is not received from the second FC-AL switch over the temporary primary trunk by the end of the random time period, re-sending the MRK ordered set to the second FC-AL switch over the temporary primary trunk; and if an acknowledgement MRK ordered set is thereafter received from the second FC-AL switch over the temporary primary trunk, reconfiguring the previously failed primary trunk to once again be the primary trunk, and reconfiguring the temporary primary trunk to once again be the duplicate trunk, and initiating a Loop Initialization cycle to initialize devices connected to the first and second FC-AL switches.

18. The first FC-AL switch as recited in claim 17, the one or more processors further programmed for performing, while in the failback mode, the steps of:

if a MRK ordered set is received from the second FC-AL switch over the temporary primary trunk by the end of the random time period, reconfiguring the previously failed primary trunk to once again be the primary trunk, and reconfiguring the temporary primary trunk to once again be the duplicate trunk, and sending an acknowledgement MRK ordered set to the second FC-AL switch over the temporary primary trunk.

19. A second Fibre Channel Arbitrated Loop (FC-AL) switch connectable to a first FC-AL switch via a primary and a duplicate trunk for assisting in synchronizing trunk failover, comprising:

one or more processors programmed for performing the steps of if a MaRK (MRK) ordered set is received from the first FC-AL switch over the duplicate trunk, reconfiguring the duplicate trunk to be a temporary primary trunk without initiating, the second FC-AL switch, a Loop Initialization cycle to initialize devices connected to the first and second FC-AL switches, and sending an acknowledgement MRK ordered set to the first FC-AL switch over the duplicate trunk to initiate, by the first FC-AL switch, a Loop Initialization cycle to initialize devices connected to the first and second FC-AL switches.

20. A second Fibre Channel Arbitrated Loop (FC-AL) switch connectable to a first FC-AL switch via a primary and a duplicate trunk for assisting in synchronizing trunk failback when the primary trunk has failed and the duplicate trunk has been reconfigured as a temporary primary trunk, comprising:

one or more processors programmed for performing the steps of
   if a MaRK (MRK) ordered set is received from the first FC-AL switch over the temporary primary trunk,
     reconfiguring the previously failed primary trunk to once again be the primary trunk, and reconfiguring the temporary primary trunk to once again be the duplicate trunk, without initiating, by the second FC-AL switch, a Loop Initialization cycle to initialize devices connected to the first and second FC-AL switches, and
     sending an acknowledgement MRK ordered set to the first FC-AL switch over the temporary primary trunk to initiate, by the first FC-AL switch, a Loop Initialization cycle to initialize devices connected to the first and second FC-AL switches.

21. A Storage Area Network (SAN) comprising the first FC-AL switch of claim 11.

22. One or more storage media including a computer program which, when executed by one or more processors in a first Fibre Channel Arbitrated Loop (FC-AL) switch connectable to a second FC-AL switch via a primary and a duplicate trunk, synchronizes trunk failover by causing the one or more processors to perform the steps of:

receiving a notification of a primary trunk failure and entering a failover mode; and
while in the failover mode,
   if no MaRK (MRK) ordered set has been received from the second FC-AL switch over the duplicate trunk, sending a MRK ordered set to the second FC-AL switch over the duplicate trunk, and
   if an acknowledgement MRK ordered set is thereafter received from the second FC-AL switch over the duplicate trunk,
     reconfiguring the duplicate trunk to be a temporary primary trunk, and
     initiating, by the first FC-AL switch, a Loop Initialization cycle to initialize devices connected to the first and second FC-AL switches while precluding the second FC-AL switch from attempting to initiate a separate Loop Initialization cycle.

23. The one or more storage media as recited in claim 22, wherein the computer program, when executed by the one or more processors, further causes the one or more processors while in the failover mode to perform the steps of:

if the acknowledgement MRK ordered set is not received from the second FC-AL switch over the duplicate trunk,
   reconfiguring the duplicate trunk to be a temporary primary trunk, and
   initiating a Loop Initialization cycle in an attempt to initialize devices connected to the first and second FC-AL switches.

24. The one or more storage media as recited in claim 22, wherein the computer program, when executed by the one or more processors, further causes the one or more processors while in the failover mode to perform the steps of:

if, after sending the MRK ordered set to the second FC-AL switch over the duplicate trunk, a MRK ordered set is received from the second FC-AL switch over the duplicate trunk instead of an acknowledgement MRK ordered set,
   waiting a random time period, and
   if a MRK ordered set is not received from the second FC-AL switch over the duplicate trunk by the end of the random time period, re-sending the MRK ordered set to the second FC-AL switch over the duplicate trunk; and if an acknowledgement MRK ordered set is thereafter received from the second FC-AL switch over the duplicate trunk,
     reconfiguring the duplicate trunk to be a temporary primary trunk, and
     initiating a Loop Initialization cycle to initialize devices connected to the first and second FC-AL switches.

25. The one or more storage media as recited in claim 24, wherein the computer program, when executed by the one or more processors, further causes the one or more processors while in the failover mode to perform the steps of:

if a MRK ordered set is received from the second FC-AL switch over the duplicate trunk by the end of the random time period,
   reconfiguring the duplicate trunk to be a temporary primary trunk, and
   sending an acknowledgement MRK ordered set to the second FC-AL switch over the duplicate trunk.

26. The one or more storage media as recited in claim 22, wherein the computer program, when executed by the one or more processors, synchronizes trunk failback by causing the one or more processors to perform the steps of:

receiving a notification of a primary trunk up event and entering a failback mode; and
while in the failback mode,
   if no MRK ordered set has been received from the second FC-AL switch over the temporary primary trunk, sending a MRK ordered set to the second FC-AL switch over the temporary primary trunk, and
   if an acknowledgement MRK ordered set is thereafter received from the second FC-AL switch over the temporary primary trunk,
     reconfiguring the previously failed primary trunk to once again be the primary trunk, and reconfiguring the temporary primary trunk to once again be the duplicate trunk, and
     initiating a Loop Initialization cycle to initialize devices connected to the first and second FC-AL switches.

27. The one or more storage media as recited in claim 26, wherein the computer program, when executed by the one or more processors, further causes the one or more processors while in the failback mode to perform the steps of:

if the acknowledgement MRK ordered set is not received from the second FC-AL switch over the temporary primary trunk,
   reconfiguring the previously failed primary trunk to once again be the primary trunk, and reconfiguring the temporary primary trunk to once again be the duplicate trunk, and
   initiating a Loop Initialization cycle in an attempt to initialize devices connected to the first and second FC-AL switches.

28. The one or more storage media as recited in claim 26, wherein the computer program, when executed by the one or more processors, further causes the one or more processors while in the failback mode to perform the steps of:

if, after sending the MRK ordered set to the second FC-AL switch over the temporary primary trunk, a MRK ordered set is received from the second FC-AL switch over the temporary primary trunk instead of an acknowledgement MRK ordered set, waiting a random time period, and if a MRK ordered set is not received from the second FC-AL switch over the temporary primary trunk by the end of the random time period, re-sending the MRK ordered set to the second FC-AL switch over the temporary primary trunk; and if an acknowledgement MRK ordered set is thereafter received from the second FC-AL switch over the temporary primary trunk, reconfiguring the previously failed primary trunk to once again be the primary trunk, and reconfiguring the temporary primary trunk to once again be the duplicate trunk, and initiating a Loop Initialization cycle to initialize devices connected to the first and second FC-AL switches.

29. The one or more storage media as recited in claim 28, wherein the computer program, when executed by the one or more processors, further causes the one or more processors while in the failback mode to perform the steps of:

if a MRK ordered set is received from the second FC-AL switch over the temporary primary trunk by the end of the random time period, reconfiguring the previously failed primary trunk to once again be the primary trunk, and reconfiguring the temporary primary trunk to once again be the duplicate trunk, and sending an acknowledgement MRK ordered set to the second FC-AL switch over the temporary primary trunk.

30. One or more storage media including a computer program which, when executed by one or more processors in a second Fibre Channel Arbitrated Loop (FC-AL) switch connectable to a first FC-AL switch via a primary and a duplicate trunk, assists in synchronizing trunk failover by causing the one or more processors to perform the steps of:

if a MaRK (MRK) ordered set is received from the first FC-AL switch over the duplicate trunk, reconfiguring the duplicate trunk to be a temporary primary trunk without initiating, by the second FC-AL switch, a Loop Initialization cycle to initialize devices connected to the first and second FC-AL switches, and sending an acknowledgement MRK ordered set to the first FC-AL switch over the duplicate trunk to initiate, by the first FC-AL switch, a Loop Initialization cycle to initialize devices connected to the first and second FC-AL switches.

31. One or more storage media including a computer program which, when executed by one or more processors in a second Fibre Channel Arbitrated Loop (FC-AL) switch connectable to a first FC-AL switch via a primary and a duplicate trunk, assists in synchronizing trunk failback when the primary trunk has failed and the duplicate trunk has been reconfigured as a temporary primary trunk by causing the one or more processors to perform the steps of:

if a MaRK (MRK) ordered set is received from the first FC-AL switch over the temporary primary trunk, reconfiguring the previously failed primary trunk to once again be the primary trunk, and reconfiguring the temporary primary trunk to once again be the duplicate trunk, without initiating, by the second FC-AL switch, a Loop Initialization cycle to initialize devices connected to the first and second FC-AL switches, and sending an acknowledgement MRK ordered set to the first FC-AL switch over the temporary primary trunk to initiate, by the first FC-AL switch, a Loop Initialization cycle to initialize devices connected to the first and second FC-AL switches.

\* \* \* \* \*